(12) United States Patent
Hioki

(10) Patent No.: US 12,163,278 B2
(45) Date of Patent: Dec. 10, 2024

(54) INK-JET TREATMENT LIQUID, INK-JET TEXTILE PRINTING DEVICE, AND INK-JET TEXTILE PRINTING METHOD

(71) Applicant: KYOCERA CORPORATION, Kyoto (JP)

(72) Inventor: Jun Hioki, Kyoto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 18/558,170

(22) PCT Filed: Aug. 30, 2022

(86) PCT No.: PCT/JP2022/032480
§ 371 (c)(1),
(2) Date: Oct. 30, 2023

(87) PCT Pub. No.: WO2023/037923
PCT Pub. Date: Mar. 16, 2023

(65) Prior Publication Data
US 2024/0218594 A1 Jul. 4, 2024

(30) Foreign Application Priority Data
Sep. 7, 2021 (JP) .................. 2021-145354

(51) Int. Cl.
| | | |
|---|---|---|
| C09D 11/54 | (2014.01) |
| B41M 5/00 | (2006.01) |
| C09D 11/102 | (2014.01) |
| C09D 11/36 | (2014.01) |
| D06P 5/08 | (2006.01) |
| D06P 5/30 | (2006.01) |
| D06M 15/643 | (2006.01) |

(52) U.S. Cl.
CPC ............ *D06P 5/30* (2013.01); *C09D 11/102* (2013.01); *C09D 11/36* (2013.01); *C09D 11/54* (2013.01); *D06P 5/08* (2013.01); *B41M 5/0047* (2013.01); *D06M 15/643* (2013.01)

(58) Field of Classification Search
CPC ... D06P 5/30; D06P 5/08; C09D 11/54; C09D 11/102; C09D 11/36; B41M 5/0047; D06M 15/643
See application file for complete search history.

(56) References Cited

U.S. PATENT DOCUMENTS

| | | | |
|---|---|---|---|
| 2004/0138337 A1 | 7/2004 | Hasegawa et al. | |
| 2010/0273929 A1 | 10/2010 | Kitagawa et al. | |
| 2014/0357773 A1* | 12/2014 | Liles ............... | B05D 3/007 524/377 |
| 2015/0166819 A1* | 6/2015 | Shinohara ......... | C09D 11/40 347/21 |

(Continued)

FOREIGN PATENT DOCUMENTS

| | | |
|---|---|---|
| JP | 2004238573 A | 8/2004 |
| JP | 2004-353093 A | 12/2004 |

(Continued)

*Primary Examiner* — Yaovi M Ameh
(74) *Attorney, Agent, or Firm* — HAUPTMAN HAM, LLP

(57) ABSTRACT

An inkjet treatment liquid contains emulsified particles containing a silicone oil and an aqueous medium, in which an average particle size of the emulsified particles is 100 nm or more and 250 nm or less.

19 Claims, 1 Drawing Sheet

(56) References Cited

U.S. PATENT DOCUMENTS

| | | |
|---|---|---|
| 2020/0317942 A1* | 10/2020 | Yamada ............... C09D 11/322 |
| 2021/0198509 A1* | 7/2021 | Sekiguchi ............ C09D 11/102 |
| 2023/0211616 A1 | 7/2023 | Hioki |

FOREIGN PATENT DOCUMENTS

| | | | |
|---|---|---|---|
| JP | 2007-031847 | A | 2/2007 |
| JP | 2009150010 | A | 7/2009 |
| JP | 2013-072045 | A | 4/2013 |
| JP | 2013-075524 | A | 4/2013 |
| JP | 2019099790 | A | 6/2019 |
| JP | 2020-105304 | A | 7/2020 |
| JP | 2021085128 | A | 6/2021 |
| JP | 2021-102337 | A | 7/2021 |
| WO | 2021/182338 | A1 | 9/2021 |

* cited by examiner

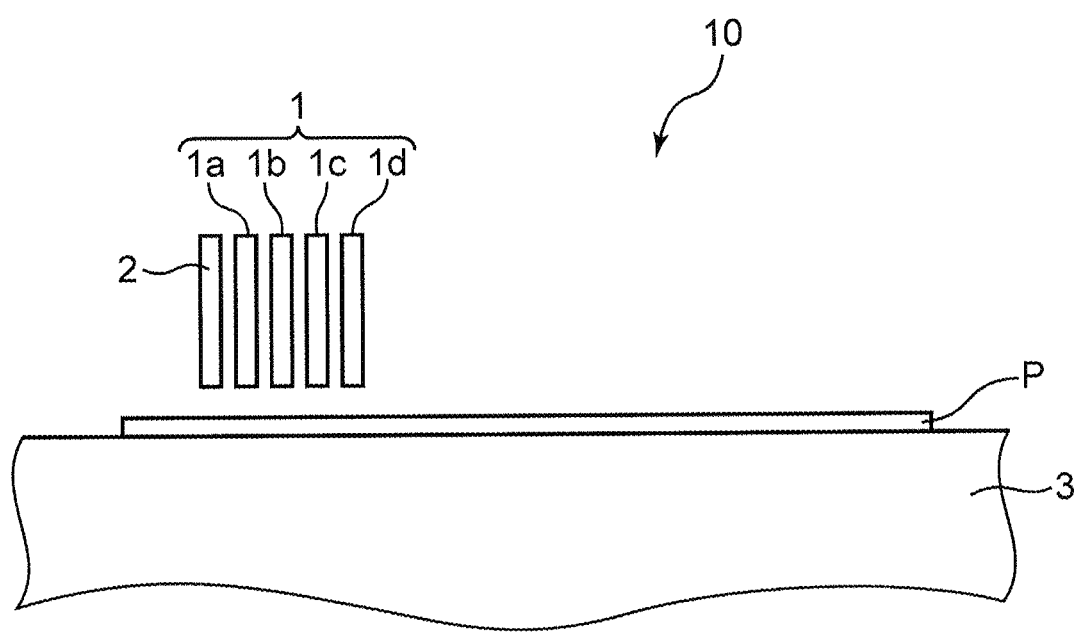

INK-JET TREATMENT LIQUID, INK-JET TEXTILE PRINTING DEVICE, AND INK-JET TEXTILE PRINTING METHOD

RELATED APPLICATIONS

The present application is a National Phase of International Application Number PCT/JP2022/032480 filed Aug. 30, 2022, which claims the benefit of priority from Japanese Patent Application No. 2021-145354, filed on Sep. 7, 2021.

TECHNICAL FIELD

The present disclosure relates to an inkjet treatment liquid, an inkjet textile printing apparatus, and an inkjet textile printing method.

BACKGROUND ART

In inkjet textile printing methods, for example, ink containing pigments are used. In order to improve the color fastness to rubbing of textile printing targets (hereinafter sometimes referred to as textile printing articles) on which images are formed, ink containing pigments is sometimes used with post-treatment liquids.

Meanwhile, transport rollers for inkjet recording apparatuses are conventionally known (see Patent Literature 1, for example). In the transport roller described in Patent Literature 1, a treatment liquid containing one or both of fullerene and a fullerene derivative is applied to the surface of the transport roller.

CITATION LIST

Patent Literature

Patent Literature 1: JP 2013-75524 A

SUMMARY OF INVENTION

An inkjet treatment liquid according to a first aspect of the present disclosure comprises emulsified particles containing a silicone oil and an aqueous medium, wherein an average particle size of the emulsified particles is 100 nm or more and 250 nm or less.

BRIEF DESCRIPTION OF DRAWINGS

FIG. 1 is a side view illustrating an example of an inkjet textile printing apparatus according to a second embodiment of the present disclosure.

DESCRIPTION OF EMBODIMENTS

In recent years, in inkjet textile printing technique, further improvement in the color fastness to rubbing of textile printing articles has been required. It is assumed that the color fastness to rubbing of textile printing articles changes depending on the concentration and kind of silicone oil contained in the treatment liquid, the amount of treatment liquid ejected, and the like (The treatment liquid may be called as a processing solution.). For example, in a case where the amount of treatment liquid ejected is a small amount, it is assumed that the color fastness to rubbing of textile printing articles may be affected when the concentration of silicone oil is too low. Hence, from the viewpoint other than the concentration adjustment and kind selection of silicone oil, it is suitable to know the conditions for the properties of an inkjet treatment liquid under which a textile printing article excellent in the color fastness to rubbing can be fabricated.

Here, it is assumed that the color fastness to rubbing of textile printing articles also changes depending on the average particle size of emulsified particles containing a silicone oil in the treatment liquid. For example, in a case where the average particle size of emulsified particles is small, it is assumed that the color fastness to rubbing of textile printing articles may be affected. Hence, from the viewpoint of average particle size of emulsified particles in the treatment liquid, it is suitable to know the conditions for the properties of an inkjet treatment liquid under which a textile printing article excellent in the color fastness to rubbing can be fabricated.

In a case where the average particle size of emulsified particles in the treatment liquid is large, when the treatment liquid is ejected from the processing head of an inkjet textile printing apparatus, the meniscus may become unstable and the ejectability may deteriorate. Hence, the inkjet treatment liquid is also required to be excellent in ejectability from the processing head. In addition, it is more preferable that the inkjet treatment liquid can also suppress deterioration in the texture of textile printing article.

The inkjet treatment liquid of the present disclosure can suppress deterioration in the texture of textile printing article, can fabricate a textile printing article excellent in the color fastness to rubbing, and is excellent in ejectability from the processing head of an inkjet textile printing apparatus.

Hereinafter, embodiments of the present disclosure will be described. In this specification, the measured value of volume median diameter ($D_{50}$) is the median diameter measured using a laser diffraction/scattering particle size distribution analyzer ("LA-950" manufactured by HORIBA, Ltd.), unless otherwise specified. Hereinafter, the volume median diameter is sometimes referred to as "$D_{50}$". The "main component" of a material means a component that is contained in the material in the largest amount by mass, unless otherwise specified. "Specific gravity" means specific gravity at 25° C. unless otherwise specified. Acryl and methacryl are collectively referred to as "(meth)acryl" in some cases. Each component described in this specification may be used singly or in combination of two or more kinds thereof.

First Embodiment: Inkjet Treatment Liquid

Hereinafter, an inkjet treatment liquid (hereinafter, also referred to as treatment liquid) according to the first embodiment of the present disclosure will be described. The treatment liquid according to the first embodiment contains emulsified particles and an aqueous medium. The emulsified particles are dispersed in the aqueous medium of the treatment liquid. In other words, the treatment liquid according to the first embodiment is an emulsion, more specifically, an oil-in-water (O/W) emulsion.

The treatment liquid according to the first embodiment is suitably used, for example, in an inkjet textile printing apparatus and an inkjet textile printing method, which will be described later. The treatment liquid according to the first embodiment is, for example, a treatment liquid for post-processing. For details, after an image is formed in the image forming region of a textile printing target with ink, the image forming region is post-processed with the treatment liquid according to the first embodiment.

<Emulsified Particles>

The emulsified particles contained in the treatment liquid contain a silicone oil. The silicone oil preferably includes at least an ionic functional group-containing silicone oil (The ionic functional group be called as an ionic group.). By containing an ionic functional group-containing silicone oil, a textile printing article particularly superior in the color fastness to wet rubbing can be fabricated. The silicone oil may be a silicone oil other than the ionic functional group-containing silicone oil (hereinafter sometimes referred to as another silicone oil). Alternatively, the silicone oil may contain both an ionic functional group-containing silicone oil and another silicone oil. In this case, both the ionic functional group-containing silicone oil and another silicone oil may be contained in one emulsified particle. Alternatively, emulsified particles contained in the treatment liquid may be two or more kinds, and for example, an ionic functional group-containing silicone oil may be contained in the first emulsified particles and another silicone oil may be contained in the second emulsified particles. As the emulsified particles contain at least a silicone oil, particularly an ionic functional group-containing silicone oil, the following first to fourth advantages are obtained.

The first advantage will be described. A silicone oil has a friction reducing effect. As the textile printing target is post-processed with the treatment liquid, the image formed on the textile printing target is coated with a silicone oil, and the coefficient of friction of the surface of the textile printing target decreases. As a result, even in a case where the image formed on the textile printing target is rubbed, the color does not easily fade, and a textile printing article excellent in the color fastness to dry rubbing and the color fastness to wet rubbing can be fabricated. As the textile printing target is coated with a silicone oil that has a friction reducing effect, friction between threads of the textile printing target is reduced. As a result, stiffening of the textile printing target caused by image formation is reduced, and deterioration in the texture of textile printing article is suppressed.

The second advantage will be described. A silicone oil has water repellency. As the textile printing target is post-processed with the treatment liquid, the textile printing target is coated with a water repellent silicone oil and water repellency is imparted to the surface of the textile printing target. As a result, even in a case where the image formed on the textile printing target is rubbed in a wet state, the color does not easily fade, and a textile printing article excellent in the color fastness to wet rubbing can be fabricated.

The third advantage will be described. Particularly in a case of containing at least an ionic functional group-containing silicone oil, it is presumed that an ionic bond is formed between the ionic functional group and the textile printing target and between the ionic functional group and the ink ejected onto the textile printing target as the ionic functional group-containing silicone oil has an ionic functional group. As an ionic bond is formed, the ionic functional group-containing silicone oil is less likely to be washed away by water from the textile printing target and ink. As a result, a textile printing article more superior in the color fastness to wet rubbing can be fabricated.

The fourth advantage will be described. Particularly in a case of containing at least an ionic functional group-containing silicone oil, as the ionic functional group-containing silicone oil has an ionic functional group, the emulsified particles containing the ionic functional group-containing silicone oil are suitably dispersed in the aqueous medium of the treatment liquid. Such a treatment liquid can be more suitably ejected from the processing head of an inkjet textile printing apparatus. In a case where the treatment liquid is ejected from the processing head, the amount of treatment liquid used is reduced compared to a case where the textile printing article is immersed in the treatment liquid. Therefore, stiffening of the textile printing target is less likely to be caused and deterioration in the texture of textile printing article is further suppressed. In addition, in a case where the treatment liquid is ejected from the processing head, a silicone oil having a high viscosity can be used compared to a case where ink containing a silicone oil as a base oil is ejected from the recording head. Therefore, a textile printing article more superior in the color fastness to rubbing can be fabricated. The first to fourth advantages have been described above.

The percentage content of silicone oil in the treatment liquid is preferably 5% by mass or more and 15% by mass or less. When the percentage content of silicone oil is 5% by mass or more, deterioration in the texture of textile printing article can be more suppressed and a textile printing article more superior in the color fastness to rubbing can be fabricated. When the percentage content of silicone oil is 15% by mass or less, ejectability of the treatment liquid from the processing head of an inkjet textile printing apparatus can be further improved. In a case where at least an ionic functional group-containing silicone oil is contained as the silicone oil, as the percentage content of silicone oil is 15% by mass or less, an excessive increase in the amount of ionic functional groups in the ionic functional group-containing silicone oil contained in the silicone oil is suppressed. As a result, it is possible to prevent difficulty in imparting appropriate water repellency to the surface of the textile printing target and to suppress a decrease in the color fastness to rubbing of the textile printing article. Although it also depends on the kind of silicone oil, a textile printing article excellent in the color fastness to rubbing can be fabricated particularly when the percentage content of silicone oil is within such a concentration range.

The percentage content of silicone oil in the treatment liquid is preferably 7% by mass or more, more preferably 9% by mass or more, still more preferably 10% by mass or more. The percentage content of silicone oil in the treatment liquid is preferably 14% by mass or less, more preferably 13% by mass or less. In particular, by setting the percentage content of silicone oil in the treatment liquid to be within the range of 10% by mass or more and 13% by mass or less, a textile printing article further superior in both the color fastness to dry rubbing and the color fastness to wet rubbing can be fabricated.

The percentage content of silicone oil in the treatment liquid means the percentage of the mass of silicone oil with respect to the mass of the treatment liquid. In a case where the emulsified particles contain two or more kinds of silicone oils (for example, ionic functional group-containing silicone oil and another silicone oil), the percentage content of silicone oil means the percentage of the total mass of the two or more kinds of silicone oils with respect to the mass of the treatment liquid.

The viscosity of silicone oil is preferably 500 mm$^2$/s (namely, mm$^2$/second) or more. When the viscosity of silicone oil is 500 mm$^2$/s or more, the silicone oil is less likely to be detached from the textile printing article by rubbing, and a textile printing article more superior in the color fastness to dry rubbing and the color fastness to wet rubbing can be fabricated. As already described, the treatment liquid according to the first embodiment is excellent in ejectability from the processing head of an inkjet textile printing apparatus. In a case where the treatment liquid is ejected from the processing head, the amount of treatment liquid used is reduced compared to a case where the textile printing article is immersed in the treatment liquid. Therefore, in a case where a silicone oil having a high viscosity of 500 mm$^2$/s or more is used in the treatment liquid as well, stiffening of the textile printing target is less likely to be caused and deterioration in the texture of textile printing article is further suppressed.

The upper limit of the viscosity of silicone oil is not particularly limited. The viscosity of silicone oil is, for example, preferably 100000 mm$^2$/s or less, preferably 6000 mm$^2$/s or less. The viscosity of silicone oil may be, for example, within the range of two values selected from the group consisting of 500 mm$^2$/s, 700 mm$^2$/s, 900 mm$^2$/s, 1000 mm$^2$/s, 1100 mm$^2$/s, 1200 mm$^2$/s, 1500 mm$^2$/s, 1700 mm$^2$/s, 1800 mm$^2$/s, 2000 mm$^2$/s, 3000 mm$^2$/s, 5700 mm$^2$/s, and 6000 mm$^2$/s.

The viscosity of silicone oil means kinematic viscosity at 25° C. In a case where the emulsified particles contain two or more kinds of silicone oils (for example, ionic functional group-containing silicone oil and another silicone oil), the viscosity of silicone oil means the viscosity of a mixture of the two or more kinds of silicone oils.

The viscosity of silicone oil is measured in conformity with the method described in JIS (Japanese Industrial Standards) Z8803:2011 (method for measuring viscosity of liquid). For example, the silicone oil can be extracted from the treatment liquid with toluene, washed, and dried to separate the silicone oil from the treatment liquid, and the viscosity of the silicone oil can be measured.

The average particle size of the emulsified particles (dispersed particle size in an aqueous medium) is 100 nm or more and 250 nm or less. When the average particle size of the emulsified particles is 100 nm or more and 250 nm or less, the inkjet treatment liquid according to the first embodiment suppresses deterioration in the texture of textile printing article, can fabricate a textile printing article excellent in the color fastness to rubbing, and is excellent in ejectability from the processing head of an inkjet textile printing apparatus.

Specifically, when the average particle size of the emulsified particles is less than 100 nm, the color fastness to rubbing, particularly color fastness to wet rubbing of the textile printing article remarkably decreases. It is considered that this is because when the particle size of the emulsified particles is too small, the specific surface area of the treatment liquid increases, and thus the hydrophilicity increases and water resistance decreases. Meanwhile, when the average particle size of the emulsified particles exceeds 250 nm, the ejectability of the treatment liquid from the processing head remarkably deteriorates.

The average particle size of the emulsified particles is preferably 100 nm or more and 160 nm or less. Alternatively, the average particle size of the emulsified particles may be, for example, within the range of two values selected from the group consisting of 100 nm, 105 nm, 110 nm, 115 nm, 120 nm, 125 nm, 130 nm, 135 nm, 140 nm, 145 nm, 150 nm, 155 nm, 160 nm, 170 nm, 180 nm, 190 nm, 200 nm, 210 nm, 220 nm, and 250 nm.

In this specification, in a case where two or more kinds of emulsified particles having different average particle sizes are contained in the treatment liquid, basically, the "average particle size of the emulsified particles is within a specific range" means that the "average particle size of two or more kinds of emulsified particles (average particle size of two or more kinds of emulsified particles combined) is within a specific range". However, in a case where two or more kinds of emulsified particles having different average particle sizes are contained in the treatment liquid in this way, it is preferable that the average particle size of each kind of emulsified particle is 100 nm or more and 250 nm or less. It is more preferable as the difference in average particle size between the two or more kinds of emulsified particles is smaller. For example, in a case where two kinds of emulsified particles having different average particle sizes are contained in the treatment liquid, it is more preferable as the average particle sizes of the two kinds of emulsified particles are closer values to each other. For example, it is preferable that the average particle sizes of two different kinds of emulsified particles are both in the range of 100 nm or more and 160 nm or less.

More specifically, in a case where the first emulsified particles and the second emulsified particles having an average particle size different from that of the first emulsified particles are contained in the treatment liquid, it is preferable that the average particle size of the first emulsified particles is 100 nm or more and 250 nm or less and the average particle size of the second emulsified particles is 100 nm or more and 250 nm or less. It is more preferable that the average particle size of the first emulsified particles is 100 nm or more and 160 nm or less and the average particle size of the second emulsified particles is 100 nm or more and 160 nm or less. It is still more preferable that the difference between the average particle size of the first emulsified particles and the average particle size of the second emulsified particles is 0 nm or more and 30 nm or less.

The average particle size of emulsified particles means a harmonic average particle size (also called a cumulant average particle size) based on the scattered light intensity calculated by the cumulant method. The average particle size of emulsified particles is measured in conformity with the method described in ISO 13321:1996 (Particle size analysis-Photon correlation spectroscopy).

The emulsified particles may further contain components other than a silicone oil. However, when the emulsified particles contain only a silicone oil, a textile printing article excellent in the color fastness to rubbing can be fabricated more reliably and deterioration in the texture of textile printing article can be suppressed more reliably.

As already described, the silicone oil contained in the emulsified particles may be any one of an ionic functional group-containing silicone oil and another silicone oil. Alternatively, the silicone oil may contain both an ionic functional group-containing silicone oil and another silicone oil. In this case, both the ionic functional group-containing silicone oil and another silicone oil may be contained in one emulsified particle. Alternatively, an ionic functional group-containing silicone oil may be contained in the first emulsified particles and another silicone oil may be contained in the second emulsified particles. Hereinafter, the ionic functional group-containing silicone oil and another silicone oil will be described.

(Ionic Functional Group-Containing Silicone Oil)

The ionic functional group-containing silicone oil is a modified silicone oil, more specifically, an ionic functional group-modified silicone oil. Examples of ionic functional group-modified silicone oils include modified silicone oils in which ionic functional groups are introduced into side chains and modified silicone oils in which ionic functional groups are introduced into terminal groups.

Modified silicone oils in which ionic functional groups are introduced into side chains have a first terminal group represented by the following Formula (1a), a repeating unit represented by the following Formula (1b), a repeating unit represented by the following Formula (1c), and a second terminal group represented by the following Formula (1d).

[Chem. 1]

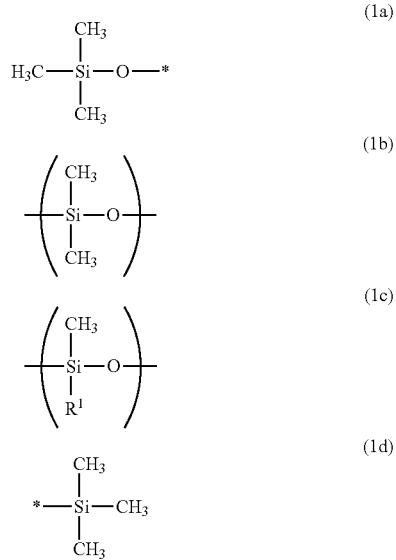

* in Formula (1a) denotes a dangling bond that bonds to a silicon atom in the repeating unit represented by Formula (1b) or (1c). * in Formula (1d) denotes a dangling bond that bonds to an oxygen atom in the repeating unit represented by Formula (1b) or (1c). $R^1$ in Formula (1c) represents a group containing an ionic functional group. The ionic functional group in the group containing an ionic functional group is preferably an amino group, a carboxy group, a phenolic hydroxy group, or a silanol group.

Modified silicone oils in which ionic functional groups are introduced into terminal groups have a first terminal group represented by the following Formula (2a), a repeating unit represented by the following Formula (2b), and a second terminal group represented by the following Formula (2c).

[Chem. 2]

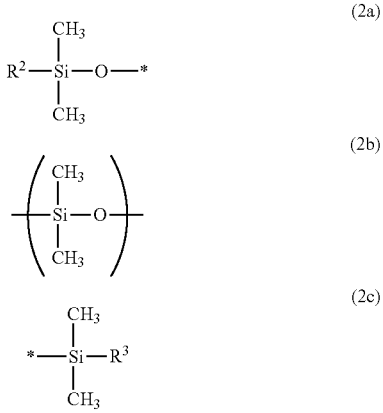

* in Formula (2a) denotes a dangling bond that bonds to a silicon atom in the repeating unit represented by Formula (2b). * in Formula (2c) denotes a dangling bond that bonds to an oxygen atom in the repeating unit represented by Formula (2b). $R^2$ in Formula (2a) and $R^3$ in Formula (2c) each independently represent a group containing an ionic functional group. The ionic functional group in the group containing an ionic functional group is preferably an amino group, a carboxy group, a phenolic hydroxy group, or a silanol group.

The ionic functional group-containing silicone oil preferably includes at least one selected from the group consisting of an amino-modified silicone oil, a carboxy-modified silicone oil, a phenol-modified silicone oil, and a silanol-modified silicone oil. Furthermore, the ionic functional group-containing silicone oil is more preferably at least one selected from the group consisting of these. The ionic functional group-containing silicone oil is more preferably one of these. An amino-modified silicone oil, a carboxy-modified silicone oil, a phenol-modified silicone oil, and a silanol-modified silicone oil have an amino group, a carboxy group, a phenolic hydroxy group, and a silanol group as an ionic functional group, respectively. Among these, the ionic functional group-containing silicone oil is more preferably a carboxy-modified silicone oil.

In a case of containing at least an ionic functional group-containing silicone oil as the silicone oil, it is preferable that the functional group equivalent of the ionic functional group-containing silicone oil is 1000 g/mol or more and 5500 g/mol or less in order to more suitably disperse emulsified particles in an aqueous medium. The functional group equivalent is the molecular weight per 1 mol of functional group (ionic functional group). The functional group equivalent of the ionic functional group-containing silicone oil is, for example, within the range of two values selected from the group consisting of 1000 g/mol, 1200 g/mol, 1474 g/mol, 1490 g/mol, 1500 g/mol, 2000 g/mol, 3800 g/mol, 3900 g/mol, 4000 g/mol, 5000 g/mol, 5200 g/mol, and 5500 g/mol.

In a case of containing at least an ionic functional group-containing silicone oil as the silicone oil, the percentage content of the ionic functional group-containing silicone oil with respect to the total mass of silicone oils contained in the emulsified particles is preferably 30% by mass or more and 100% by mass or less, more preferably 40% by mass or more and 100% by mass or less, particularly preferably 100% by mass.

(Another Silicone Oil)

The silicone oil contained in the treatment liquid may be only another silicone oil. Alternatively, as another silicone oil is further contained in addition to an ionic functional group-containing silicone oil, the viscosity of silicone oil can be adjusted. Examples of another silicone oil include unmodified silicone oil. More specific examples thereof include dimethylpolysiloxane.

In a case where another silicone oil is contained, the percentage content of another silicone oil with respect to the total mass of silicone oils contained in the emulsified particles is preferably 50% by mass or more and 100% by mass or less, more preferably 50% by mass or more and 70% by mass or less, still more preferably 50% by mass or more and 60% by mass or less.

In a case where the silicone oil contained in the treatment liquid contains both an ionic functional group-containing silicone oil and another silicone oil, the silicone oil is preferably a combination of a carboxy-modified silicone oil and dimethylpolysiloxane. In this case, both a carboxy-modified silicone oil and dimethylpolysiloxane may be contained in one kind of emulsified particles. Alternatively, a carboxy-modified silicone oil may be contained in the first emulsified particles and dimethylpolysiloxane may be contained in the second emulsified particles, which are another kind of emulsified particles.

In a case where the silicone oil contained in the treatment liquid contains both an ionic functional group-containing silicone oil and another silicone oil, the ratio of the mass of the ionic functional group-containing silicone oil to the mass of the other silicone oil is preferably 0.5 or more and less than 1.0, more preferably 0.6 or more and 0.7 or less.

<Aqueous Medium>

The aqueous medium contained in the treatment liquid is a medium containing water as a main component. The aqueous medium may function as a solvent or as a dispersion medium. Specific examples of the aqueous medium include water or a mixture of water and a polar solvent. Examples of the polar solvent contained in the aqueous medium include methanol, ethanol, isopropyl alcohol, butanol, and methyl ethyl ketone. The percentage content of water in the aqueous medium is preferably 90% by mass or more, particularly preferably 100% by mass. The percentage content of the aqueous medium is preferably 50% by mass or more and 90% by mass or less, more preferably 55% by mass or more and 70% by mass or less with respect to the mass of the treatment liquid.

<Other Components>

The treatment liquid may contain components (hereinafter, sometimes referred to as other components) other than the emulsified particles and the aqueous medium, if necessary. Examples of the other components include acids, bases, polyols, and dispersants.

(Acid)

In a case where at least an ionic functional group-containing silicone oil is contained as the silicone oil, and the ionic functional group-containing silicone oil has an anionic functional group, it is preferable that the treatment liquid contains an acid. The ionization of the anionic functional groups is promoted by the acid, and the emulsified particles containing the ionic functional group-containing silicone oil are suitably dispersed in the aqueous medium. Examples of the acid include strong acids and weak acids. Examples of the strong acids include hydrochloric acid, p-toluenesulfonic acid, and sulfuric acid. Examples of the weak acids include benzoic acid and acetic acid. A strong acid is preferable as the acid in order to promote the ionization of anionic functional groups of the silicone oil. Specifically, hydrochloric acid, p-toluenesulfonic acid, or sulfuric acid is more preferable. In a case where the treatment liquid contains an acid, the percentage content of the acid in terms of the amount of acid at a concentration of 1 mol/L is preferably 1% by mass or more and 5% by mass or less with respect to the mass of the treatment liquid.

(Base)

In a case where at least an ionic functional group-containing silicone oil is contained as the silicone oil, and the ionic functional group-containing silicone oil has a cationic functional group, it is preferable that the treatment liquid contains a base. The ionization of the cationic functional groups is promoted by the base, and the emulsified particles containing the ionic functional group-containing silicone oil are suitably dispersed in the aqueous medium. Examples of the base include sodium hydroxide. In a case where the treatment liquid contains a base, the percentage content of the base in terms of the amount of base at a concentration of 1 mol/L is preferably 1% by mass or more and 5% by mass or less with respect to the mass of the treatment liquid.

(Polyol)

When the treatment liquid contains a polyol, the viscosity of the treatment liquid is suitably adjusted. As the polyol, diols or triols are preferable. Examples of the diols include glycol compounds. More specific examples thereof include ethylene glycol, propylene glycol, diethylene glycol, triethylene glycol, and tetraethylene glycol. Examples of the triols include glycerin. In a case where the treatment liquid contains a polyol, the percentage content of polyol is preferably 10% by mass or more and 40% by mass or less, more preferably 15% by mass or more and 35% by mass or less with respect to the mass of the treatment liquid.

(Dispersant)

Examples of dispersants include surfactants, resin dispersants, and polysaccharides. However, it is preferable that the emulsified particles are dispersed in the treatment liquid, which does not contain a dispersant. As already described, emulsified particles containing a silicone oil, particularly an ionic functional group-containing silicone oil are more suitably dispersed in an aqueous medium. Therefore, the dispersed state of emulsified particles can be suitably maintained in a case where a dispersant is not contained as well. Dispersants often have hydrophilic groups. When a dispersant having a hydrophilic group is not contained in the treatment liquid, the color fastness to wet rubbing of the textile printing article processed with the treatment liquid is further improved.

<Method for Producing Treatment Liquid>

An example of a method for producing a treatment liquid will be described. Using a homogenizer, a silicone oil, an aqueous medium, and components (for example, acid or base and polyol) added if necessary are mixed together and emulsified. Thus, emulsified particles containing a silicone oil are dispersed in the aqueous medium to obtain a treatment liquid.

In order to facilitate emulsification, a raw material emulsion containing emulsified particles may be produced in advance, and the raw material emulsion, an aqueous medium, and a polyol if necessary may be mixed together to obtain a treatment liquid. The raw material emulsion contains, for example, a silicone oil, a portion of aqueous medium, and an acid or base if necessary. In the production of raw material emulsion, the emulsification time is, for example, 5 minutes or more and 1 hour or less. The emulsification temperature is, for example, 5° C. or more and 40° C. or less. The percentage content of raw material emulsion is, for example, 15% by mass or more and 50% by mass or less with respect to the mass of the treatment liquid.

In a case where two or more kinds of silicone oils, for example, both an ionic functional group-containing silicone oil and an unmodified silicone oil are used as raw materials, the two silicone oils may be mixed and emulsified to fabricate emulsified particles containing both the ionic functional group-containing silicone oil and the unmodified silicone oil, and a treatment liquid may be obtained. Alternatively, by mixing a raw material emulsion of an ionic functional group-containing silicone oil and a raw material emulsion of an unmodified silicone oil, a treatment liquid may be obtained in which first emulsified particles containing an ionic functional group-containing silicone oil and separate second emulsified particles containing an unmodified silicone oil are present together.

The method for adjusting the average particle size of emulsified particles contained in the treatment liquid to be within the range of 100 nm or more and 250 nm or less is not particularly limited. For example, an appropriately adjusted amount of surfactant may be added and mixed when the treatment liquid or raw material emulsion is prepared. Specifically, the average particle size of emulsified particles can be diminished by increasing the amount of surfactant added. Examples of the surfactant include polyoxyethylene alkyl ether.

Second Embodiment: Inkjet Textile Printing Apparatus

Next, an inkjet textile printing apparatus 10 according to a second embodiment of the present disclosure will be described with reference to FIG. 1. For ease of understanding, FIG. 1 schematically illustrates mainly the respective constituents. The size, number, and the like of each illustrated constituent may be changed as appropriate. FIG. 1 is a side view illustrating the main part of the inkjet textile printing apparatus 10, which is an example of the inkjet textile printing apparatus according to the second embodiment. The inkjet textile printing apparatus 10 illustrated in FIG. 1 is a flatbed type inkjet textile printing apparatus.

The inkjet textile printing apparatus 10 according to the second embodiment processes a textile printing target P using the treatment liquid according to the first embodiment. Since the treatment liquid according to the first embodiment is used, for the same reason as that described in the first embodiment, according to the inkjet textile printing apparatus 10, a textile printing article excellent in the color fastness to rubbing can be fabricated and deterioration in the texture of textile printing article can be suppressed. Furthermore, since the treatment liquid according to the first embodiment is excellent in ejectability from the processing head, according to the inkjet textile printing apparatus according to the second embodiment, these effects can be exerted reliably.

The inkjet textile printing apparatus 10 illustrated in FIG. 1 comprises a recording head 1, a processing head 2, and a mounting table 3. The recording head 1 comprises a first recording head 1a, a second recording head 1b, a third recording head 1c, and a fourth recording head 1d.

The recording head 1 ejects ink onto the image forming region of the textile printing target P. The first recording head 1a, second recording head 1b, third recording head 1c, and fourth recording head 1d of the recording head 1 eject inks of different colors (for example, yellow ink, magenta ink, cyan ink, and black ink), respectively. The recording head 1 is not particularly limited, but examples thereof include a piezo printhead and a thermal inkjet printhead.

The processing head 2 ejects a treatment liquid onto at least the image forming region of the textile printing target P. The treatment liquid is the treatment liquid according to the first embodiment. The processing head 2 is not particularly limited, but examples thereof include a piezo printhead and a thermal inkjet printhead.

The textile printing target P is placed on the mounting table 3. The recording head 1 and the processing head 2 are arranged above the mounting table 3 so that the ink and treatment liquid can be ejected onto the textile printing target P. Driven by a motor (not illustrated), the mounting table 3 moves horizontally in a direction (for example, leftward in FIG. 1) from the recording head 1 toward the processing head 2. The textile printing target P on the mounting table 3 is conveyed as the mounting table 3 moves horizontally.

The textile printing target P may be a woven fabric or a knitted fabric. Examples of the textile printing target P include cotton cloth, silk cloth, linen cloth, acetate cloth, rayon cloth, nylon cloth, polyurethane cloth, and polyester cloth.

In the fabrication of textile printing article, first, the mounting table 3 on which the textile printing target P is placed horizontally moves, and the textile printing target P is conveyed to a position facing the recording head 1. Ink is ejected from the recording head 1 onto the image forming region of the textile printing target P. In this way, an image is formed in the image forming region of the textile printing target P with ink. After ink is ejected, the mounting table 3 on which the textile printing target P is placed further moves horizontally, and the textile printing target P is conveyed to a position facing the processing head 2. The treatment liquid is ejected from the processing head 2 onto at least the image forming region of the textile printing target P. In this way, a processing film is formed with the treatment liquid on the image formed in the image forming region of the textile printing target P.

The processing head 2 may eject the treatment liquid only onto the image forming region of the textile printing target P. Alternatively, the processing head 2 may eject the treatment liquid onto a region wider than the image forming region of the textile printing target P or may eject the treatment liquid onto the entire surface of the textile printing target P. In order to reduce the amount of treatment liquid used and suppress deterioration in the texture of textile printing article, it is preferable that the processing head 2 ejects the treatment liquid only onto the image forming region of the textile printing target P. For the same reason, it is more preferable that the processing head 2 ejects the treatment liquid only onto the region where ink has been ejected by the recording head 1 among the image forming regions. Since the processing head 2 can accurately control the position where the treatment liquid is ejected, it is possible to eject the treatment liquid only onto the region where ink has been ejected. In order to accurately control the position where the treatment liquid is ejected, it is preferable that the distance between the processing head 2 and the textile printing target P is 1 mm or more and 5 mm or less. In order to efficiently proceed with the post-processing using the treatment liquid, it is preferable that only the treatment liquid is ejected from the processing head 2.

After the treatment liquid is ejected from the processing head 2 onto the textile printing target P, the mounting table 3 on which the textile printing target P is placed further moves horizontally, and the textile printing target P is conveyed to a position facing the heating unit (not illustrated). The heating unit heats the textile printing target P to dry the ink and treatment liquid. The heating temperature is, for example, 120° C. or more and 180° C. or less. The heating time is, for example, 1 minute or more and 10 minutes or less. By heating, the volatile components contained in the ink and treatment liquid evaporate, and fixation of the ink and treatment liquid to the textile printing target P is promoted. As a result, a textile printing article is fabricated, which is a textile printing target P subjected to image formation with ink and processing with a treatment liquid.

The inkjet textile printing apparatus 10 according to the second embodiment has been described above. However, the inkjet textile printing apparatus of the present disclosure is not limited to the inkjet textile printing apparatus 10, and can be modified, for example, as shown in the following modified examples.

Regarding the first modified example, the inkjet textile printing apparatus 10 may include a spray for spraying the treatment liquid instead of the processing head 2 for ejecting the treatment liquid.

Regarding the second modified example, the processing with the treatment liquid may be carried out by immersing the textile printing target P in a tank in which the treatment liquid is stored. In the case of immersion, the amount of the treatment liquid ejected described later in the third embodiment corresponds to the amount of the treatment liquid applied.

Regarding the third modified example, the recording head 1 and the processing head 2 may move horizontally in a state where the mounting table 3 is fixed although the mounting table 3 moves horizontally in the above-described embodiment.

Regarding the fourth modified example, the recording head 1 and the processing head 2 may move horizontally in a direction perpendicular to the direction in which the textile printing target P is conveyed as well as the mounting table 3 moves horizontally or the recording head 1 and the processing head 2 move horizontally in the direction in which the textile printing target P is conveyed.

Regarding the fifth modified example, the number of recording heads 1 may be 1 to 3 or 5 or more.

Regarding the sixth modified example, the inkjet textile printing apparatus may be an inkjet textile printing apparatus that is not a flatbed type. The effects by the use the treatment liquid according to the first embodiment can be obtained regardless of the type of inkjet textile printing apparatus as long as the inkjet textile printing apparatus includes the recording head 1 and the processing head 2.

Third Embodiment: Inkjet Textile Printing Method

Next, an inkjet textile printing method according to a third embodiment of the present disclosure will be described while continuing to refer to FIG. 1. In the inkjet textile printing method according to the third embodiment, an image is formed in the image forming region of the textile printing target P using the treatment liquid according to the first embodiment. In the inkjet textile printing method according to the third embodiment, an image is formed in the image forming region of the textile printing target P using the inkjet textile printing apparatus 10 according to the second embodiment. In the inkjet textile printing method according to the third embodiment, since the treatment liquid according to the first embodiment is used, for the same reason as that described in the first embodiment, a textile printing article excellent in the color fastness to rubbing can be fabricated and deterioration in the texture of textile printing article can be suppressed. Furthermore, since the treatment liquid according to the first embodiment is excellent in ejectability from the processing head, according to the inkjet textile printing method according to the third embodiment, these effects can be exerted reliably.

An inkjet textile printing method according to the third embodiment includes ejecting ink and ejecting treatment liquid. In the ejecting ink, ink is ejected from the recording head 1 onto the image forming region of the textile printing target P. In the ejecting treatment liquid, the treatment liquid is ejected from the processing head 2 onto at least the image forming region of the textile printing target P. The treatment liquid is the treatment liquid according to the first embodiment. The ejecting treatment liquid is performed, for example, after the ejecting ink. The inkjet textile printing method may further include a heating step, if necessary.

In the ejecting ink, the amount of ink ejected onto the textile printing target P is, for example, 5 g/m$^2$ or more and 40 g/m$^2$ or less.

In the ejecting treatment liquid, the amount of treatment liquid ejected to the textile printing target P is, for example, 10 g/m$^2$ or more and 120 g/m$^2$ or less (including the case of application). In order to particularly improve the color fastness to dry rubbing, it is preferable that the amount of treatment liquid ejected is 15 g/m$^2$ or more and 30 g/m$^2$ or less. In order to particularly improve the color fastness to wet rubbing in addition to the color fastness to dry rubbing, it is more preferable that the amount of treatment liquid ejected is 17 g/m$^2$ or more and 25 g/m$^2$ or less. The inkjet textile printing method according to the third embodiment has been described above with reference to FIG. 1.

[Ink Used in Second Embodiment and Third Embodiment]

Next, ink used in the second embodiment and third embodiment will be described. The ink contains, for example, a pigment and an aqueous medium. The ink may further contain at least one selected from the group consisting of surfactants, polyols, and binder resin particles, if necessary.

(Pigment)

The pigment is present, for example, in a state of being dispersed in an aqueous medium. From the viewpoint of obtaining ink excellent in image density, hue, and color stability, $D_{50}$ of the pigment is preferably 30 nm or more and 250 nm or less, more preferably 70 nm or more and 160 nm or less.

Examples of the pigment include yellow pigments, orange pigments, red pigments, blue pigments, purple pigments, and black pigments. Examples of the yellow pigments include C.I. Pigment Yellow (74, 93, 95, 109, 110, 120, 128, 138, 139, 151, 154, 155, 173, 180, 185, and 193). Examples of the orange pigments include C.I. Pigment Orange (34, 36, 43, 61, 63, and 71). Examples of the red pigments include C.I. Pigment Red (122 and 202). Examples of the blue pigments include C.I. Pigment Blue (15, more specifically 15:3). Examples of the purple pigments include C.I. Pigment Violet (19, 23, and 33). Examples of the black pigments include C.I. Pigment Black (7).

The percentage content of pigment is preferably 1% by mass or more and 12% by mass or less, more preferably 1% by mass or more and 7% by mass or less with respect to the mass of the ink. When the percentage content of pigment is 1% by mass or more, the image density of the textile printing article to be fabricated can be improved. When the percentage content of pigment is 12% by mass or less, ink exhibiting high fluidity can be obtained.

(Aqueous Medium)

The aqueous medium contained in the ink is synonymous with the aqueous medium contained in the treatment liquid described in the first embodiment. The percentage content of the aqueous medium is preferably 5% by mass or more and 70% by mass or less, more preferably 40% by mass or more and 60% by mass or less with respect to the mass of the ink.

(Surfactant)

When the ink contains a surfactant, the wettability of the ink to the textile printing target is improved. Examples of the surfactant include anionic surfactants, cationic surfactants, nonionic surfactants, and amphoteric surfactants. The surfactant contained in the ink is preferably a nonionic surfactant. The nonionic surfactant is preferably a surfactant having an acetylene glycol structure, more preferably an acetylene diol ethylene oxide adduct. The HLB value of the surfactant is preferably 3 or more and 20 or less, more preferably 6 or more and 16 or less, still more preferably 7 or more and 10 or less. The HLB value of a surfactant is calculated, for example, from the formula "HLB value=20× (sum of formula weights of hydrophilic moieties)/molecular weight" by the Griffin's method. In order to improve image density while suppressing image offset, the percentage content of surfactant is preferably 0.1% by mass or more and 5.0% by mass or less, more preferably 0.5% by mass or more and 2.0% by mass or less with respect to the mass of the ink.
(Polyol)

When the ink contains a polyol, the viscosity of the ink is suitably adjusted. The polyol contained in the ink is synonymous with the polyol contained in the treatment liquid described in the first embodiment. In a case where the ink contains a polyol, in order to suitably adjust the viscosity of the ink, the percentage content of polyol is preferably 5% by mass or more and 60% by mass or less, more preferably 20% by mass or more and 50% by mass or less with respect to the mass of the ink.
(Binder Resin Particles)

The binder resin particles are present in a state of being dispersed in an aqueous medium. The binder resin particles function as a binder that binds the textile printing target and the pigment to each other. Therefore, when the ink contains binder resin particles, a textile printing article excellent in pigment fixability can be obtained.

Examples of resin contained in the binder resin particles include urethane resins, (meth)acrylic resins, styrene-(meth)acrylic resins, styrene-maleic acid copolymers, vinylnaphthalene-(meth)acrylic acid copolymers, and vinylnaphthalene-maleic acid copolymers. A urethane resin is preferable as the resin contained in the binder resin particles. The percentage content of urethane resin in the binder resin particles is preferably 80% by mass or more, more preferably 100% by mass.

The percentage content of binder resin is preferably 1% by mass or more and 20% by mass or less, more preferably 2% by mass or more and 10% by mass or less with respect to the mass of the ink. When the percentage content of binder resin particles is 1% by mass or more, a textile printing target excellent in pigment fixability can be obtained. Meanwhile, when the percentage content of binder resin particles is 20% by mass or less, the ink can be stably ejected onto the textile printing target.
(Additive)

The ink may further contain known additives (more specifically, dissolution stabilizers, drying inhibitors, antioxidants, viscosity modifiers, pH modifiers, antifungal agents, and the like), if necessary.
(Method for Producing Ink)

The ink is produced by, for example, mixing a pigment, an aqueous medium, and components (for example, surfactant, polyol, and binder resin particles) added if necessary using a stirrer. The mixing time is, for example, 1 minute or more and 30 minutes or less.

SUMMARY OF PRESENT DISCLOSURE

An inkjet treatment liquid according to a first aspect of the present disclosure comprises emulsified particles containing a silicone oil and an aqueous medium,
wherein an average particle size of the emulsified particles is 100 nm or more and 250 nm or less.

This inkjet treatment liquid can suppress deterioration in the texture of textile printing article, can fabricate a textile printing article excellent in the color fastness to rubbing, and is excellent in ejectability from the processing head of an inkjet textile printing apparatus.

In the inkjet treatment liquid described above, the average particle size of the emulsified particles may be 100 nm or more and 160 nm or less.

By having such a configuration, the inkjet treatment liquid is more superior in ejectability from the processing head.

In the inkjet treatment liquid described above, the emulsified particles may include first emulsified particles and second emulsified particles having an average particle size different from an average particle size of the first emulsified particles,
the average particle size of the first emulsified particles may be 100 nm or more and 250 nm or less, and
the average particle size of the second emulsified particles may be 100 nm or more and 250 nm or less.

By having such a configuration, in a case where two or more kinds of emulsified particles having different average particle sizes are contained as well, it is possible to reliably exert the above-described effect of suppressing deterioration in the texture of textile printing article, effect of excellent color fastness to rubbing, and effect of ejectability.

In the inkjet treatment liquid, the average particle size of the first emulsified particles may be 100 nm or more and 160 nm or less, and
the average particle size of the second emulsified particles may be 100 nm or more and 160 nm or less.

By having such a configuration, in a case where two or more kinds of emulsified particles having different average particle sizes are contained as well, it is possible to more reliably exert the above-described effect of suppressing deterioration in the texture of textile printing article, effect of excellent color fastness to rubbing, and effect of ejectability.

In the inkjet treatment liquid, a difference between the average particle size of the first emulsified particles and the average particle size of the second emulsified particles may be 0 nm or more and 30 nm or less.

By having such a configuration, in a case where two or more kinds of emulsified particles having different average particle sizes are contained as well, it is possible to still more reliably exert the above-described effect of suppressing deterioration in the texture of textile printing article, effect of excellent color fastness to rubbing, and effect of ejectability.

In the inkjet treatment liquid described above, the silicone oil may include at least an ionic functional group-containing silicone oil.

By containing at least an ionic functional group-containing silicone oil, a textile printing article more superior in the color fastness to wet rubbing can be fabricated.

In the above-described inkjet treatment liquid, the inkjet treatment liquid may be for textile printing.

By using the above-described inkjet treatment liquid for textile printing, the effect of suppressing deterioration in the texture of textile printing article and the effect of excellent color fastness to rubbing can be exerted more effectively.

An inkjet textile printing apparatus according to a second aspect of the present disclosure comprises a recording head configured to eject ink onto an image forming region of a textile printing target and a processing head configured to eject a treatment liquid onto at least the image forming region of the textile printing target,
wherein the treatment liquid is the inkjet treatment liquid according to the first aspect of the present disclosure.

In this inkjet textile printing apparatus, since the inkjet treatment liquid according to the first aspect of the present disclosure is used, a textile printing article in which deterioration in texture is suppressed can be fabricated and a textile printing article excellent in the color fastness to rubbing can be fabricated. Furthermore, since the inkjet treatment liquid is excellent in ejectability from the processing head, the effect of the inkjet treatment liquid according to the first aspect of the present disclosure on a textile printing article can be reliably exerted.

An inkjet textile printing method according to a third aspect of the present disclosure comprises ejecting ink from a recording head onto an image forming region of a textile printing target and ejecting a treatment liquid from a processing head onto at least the image forming region of the textile printing target, wherein the treatment liquid is the inkjet treatment liquid according to the first aspect of the present disclosure.

In the inkjet textile printing method, since the inkjet treatment liquid according to the first aspect of the present disclosure is used, a textile printing article in which deterioration in texture is suppressed can be fabricated and a textile printing article excellent in the color fastness to rubbing can be fabricated. Furthermore, since the inkjet treatment liquid is excellent in ejectability from the processing head, the effect of the inkjet treatment liquid according to the first aspect of the present disclosure on a textile printing article can be reliably exerted.

EXAMPLES

Hereinafter, the present disclosure will be described more specifically with reference to Examples, but the present disclosure is not limited by Examples at all.

In the present Examples, various textile printing articles were fabricated while changing the kind and percentage content of silicone oil in the inkjet treatment liquid, the average particle size of emulsified particles, and the amount of the treatment liquid ejected, and the color fastness to rubbing and suppression of deterioration in the texture of textile printing articles were evaluated. Furthermore, in the present Examples, the ejectability of the treatment liquid from the nozzle according to the average particle size of the emulsified particles of a silicone oil in the inkjet treatment liquid was also evaluated.

1. Evaluation Test of Color Fastness to Rubbing and Suppression of Deterioration in Texture of Textile Printing Article when Kind of Treatment Liquid (Kind and Percentage Content of Silicone Oil in Treatment Liquid and Average Particle Size of Emulsified Particles) is Changed In this test, the amount of treatment liquid ejected during fabrication of textile printing articles was set to 20 g/m$^2$, and various textile printing articles were fabricated while changing the kind and percentage content of silicone oil in the treatment liquid and the average particle size of emulsified particles. Thereafter, the color fastness to rubbing and suppression of deterioration in texture of various textile printing articles fabricated were evaluated.

[Method for Preparing Treatment Liquid]

The treatment liquids (A-1) to (A-7) and treatment liquid (B-1) used in this evaluation test were prepared by the method described below. The percentage content of silicone oil was calculated by rounding off to the first decimal place.

<Preparation of Treatment Liquid (A-1)>

First, a raw material emulsion A to be contained in a treatment liquid (A-1) was prepared. Specifically, 300 g of amino-modified silicone oil ("KF-864" manufactured by Shin-Etsu Chemical Co., Ltd., viscosity: 1,700 mm$^2$/s, specific gravity: 0.98, functional group equivalent: 3,800 g/mol), 600 g of ion exchanged water, and 100 g of hydrochloric acid (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion A. Emulsified particles containing an amino-modified silicone oil were dispersed in the raw material emulsion A. The average particle size of the emulsified particles contained in the raw material emulsion A was 150 nm.

Next, a treatment liquid (A-1) was prepared using the raw material emulsion A prepared as described above. Specifically, 33.30 g of raw material emulsion A (percentage content of amino-modified silicone oil: 30% by mass and content of amino-modified silicone oil: 9.99 g), 33.35 g of ion exchanged water, and 33.35 g of propylene glycol were mixed together to obtain a treatment liquid (A-1). In the treatment liquid (A-1), the percentage content of amino-modified silicone oil was 10% by mass.

<Preparation of Treatment Liquid (A-2)>

In the preparation of treatment liquid (A-2), the raw material emulsion A prepared as described above was used. Specifically, 15.00 g of raw material emulsion A (percentage content of amino-modified silicone oil: 30% by mass and content of amino-modified silicone oil: 4.50 g), 50.00 g of ion exchanged water, and 35.00 g of propylene glycol were mixed together to obtain a treatment liquid (A-2). In the treatment liquid (A-2), the percentage content of amino-modified silicone oil was 5% by mass.

<Preparation of Treatment Liquid (A-3)>

In the preparation of treatment liquid (A-3), the raw material emulsion A prepared as described above was used. Specifically, 50.00 g of raw material emulsion A (percentage content of amino-modified silicone oil: 30% by mass and content of amino-modified silicone oil: 15.00 g), 35.00 g of ion exchanged water, and 15.00 g of propylene glycol were mixed together to obtain a treatment liquid (A-3). In the treatment liquid (A-3), the percentage content of amino-modified silicone oil was 15% by mass.

<Preparation of Treatment Liquid (A-4)>

First, a raw material emulsion B to be contained in a treatment liquid (A-4) was prepared. Specifically, 300 g of carboxy-modified silicone oil ("X-22-3701E" manufactured by Shin-Etsu Chemical Co., Ltd., viscosity: 2,000 mm$^2$/s, specific gravity: 0.98, functional group equivalent: 4,000 g/mol), 600 g of ion exchanged water, and 100 g of sodium hydroxide aqueous solution (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion B. Emulsified particles containing a carboxy-modified silicone oil were dispersed in the raw material emulsion B. The average particle size of the emulsified particles contained in the raw material emulsion B was 120 nm.

Next, a treatment liquid (A-4) was prepared using the raw material emulsion B prepared as described above. Specifically, the treatment liquid (A-4) was obtained in the same manner as the treatment liquid (A-1) except that the raw material emulsion A (percentage content of amino-modified silicone oil: 30% by mass) was changed to the raw material emulsion B (percentage content of carboxy-modified silicone oil: 30% by mass). In the treatment liquid (A-4), the percentage content of carboxy-modified silicone oil was 10% by mass.

<Preparation of Treatment Liquid (A-5)>

First, a raw material emulsion C to be contained in a treatment liquid (A-5) was prepared. Specifically, 300 g of amino-modified silicone oil ("KF-877" manufactured by Shin-Etsu Chemical Co., Ltd., viscosity: 5,700 mm²/s, specific gravity: 0.98, functional group equivalent: 5,200 g/mol), 600 g of ion exchanged water, and 100 g of hydrochloric acid (concentration: 1 mol/L) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion C. Emulsified particles containing an amino-modified silicone oil were dispersed in the raw material emulsion C. The average particle size of the emulsified particles contained in the raw material emulsion C was 200 nm.

Next, a treatment liquid (A-5) was prepared using the raw material emulsion C prepared as described above. Specifically, the treatment liquid (A-5) was obtained in the same manner as the treatment liquid (A-1) except that the raw material emulsion A (percentage content of amino-modified silicone oil: 30% by mass) was changed to the raw material emulsion C (percentage content of amino-modified silicone oil: 30% by mass). In the treatment liquid (A-5), the percentage content of amino-modified silicone oil was 10% by mass.

<Preparation of Treatment Liquid (A-6)>

First, a raw material emulsion D to be contained in a treatment liquid (A-6) was prepared. Specifically, 180 g of unmodified silicone oil (specifically, dimethylpolysiloxane) ("KF96-3000cs" manufactured by Shin-Etsu Chemical Co., Ltd., viscosity: 3,000 mm²/s, specific gravity: 0.97) and 120 g of phenol-modified silicone oil ("KF2201" manufactured by Shin-Etsu Chemical Co., Ltd., viscosity: 97 m²/s, specific gravity: 0.99, functional group equivalent: 1,474 g/mol) were mixed together to obtain a mixture MD having a viscosity of 1,000 mm²/s. Into a beaker, 300 g of mixture MD, 600 g of ion exchanged water, and 100 g of sodium hydroxide aqueous solution (concentration 1 mol/L) were put. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion D. In the raw material emulsion D, emulsified particles containing an unmodified silicone oil and a phenol-modified silicone oil were dispersed. The average particle size of the emulsified particles contained in the raw material emulsion D was 160 nm.

Next, a treatment liquid (A-6) was prepared using the raw material emulsion D prepared as described above. Specifically, the treatment liquid (A-6) was obtained in the same manner as the treatment liquid (A-1) except that the raw material emulsion A (percentage content of amino-modified silicone oil: 30% by mass) was changed to the raw material emulsion D (percentage content of mixture of phenol-modified silicone oil and unmodified silicone oil: 30% by mass). The percentage content of the mixture of phenol-modified silicone oil and unmodified silicone oil in the treatment liquid (A-6) was 10% by mass.

<Preparation of Treatment Liquid (A-7)>

First, a raw material emulsion E to be contained in a treatment liquid (A-7) was prepared. Specifically, 180 g of unmodified silicone oil ("KF96-3000cs" manufactured by Shin-Etsu Chemical Co., Ltd., viscosity: 3,000 mm²/s, specific gravity: 0.97) and 120 g of silanol-modified silicone oil ("KF9701" manufactured by Shin-Etsu Chemical Co., Ltd., viscosity: 60 mm²/s, specific gravity: 0.977, functional group equivalent: 1,500 g/mol) were mixed together to obtain a mixture ME having a viscosity of 1,200 mm²/s. Into a beaker, 300 g of mixture ME, 600 g of ion exchanged water, and 100 g of sodium hydroxide aqueous solution (concentration 1 mol/L) were put. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a raw material emulsion E. In the raw material emulsion E, emulsified particles containing an unmodified silicone oil and a silanol-modified silicone oil were dispersed. The average particle size of the emulsified particles contained in the raw material emulsion E was 220 nm.

<Preparation of Treatment Liquid (B-1)>

First, a raw material emulsion F to be contained in a treatment liquid (B-1) was prepared. Specifically, 300 g of unmodified silicone oil ("KF96-3000cs" manufactured by Shin-Etsu Chemical Co., Ltd., viscosity: 3,000 mm²/s, specific gravity: 0.97), 600 g of ion exchanged water, and 100 g of hydrochloric acid (concentration: 1 mol/L) were put into a beaker. Using a homogenizer ("Ultra Turrax T25" manufactured by IKA), the contents in the beaker were stirred at a rotation speed of 10000 rpm for 15 minutes, and only emulsified particles having an average particle size of 1 μm or more could be fabricated. After stirring, the contents in the beaker were left to stand still for 30 minutes, but the water phase and the oil phase were separated, and the raw material emulsion F could not be prepared. Thus, the raw material emulsion F could not be prepared, and the preparation of treatment liquid (B-1) was not performed. Moreover, since the preparation of treatment liquid (B-1) was not performed, the evaluation of treatment liquid (B-1) was also not performed.

The kinds of raw material emulsions, the average particle sizes of emulsified particles, the kinds and percentage contents of silicone oils, and the viscosities of silicone oils in the treatment liquids (A-1) to (A-7) and treatment liquid (B-1) are summarized in Table 1 below.

TABLE 1

| Kind of treatment liquid | Kind of raw material emulsion | Average particle size of emulsified particles (nm) | Silicone oil | | |
|---|---|---|---|---|---|
| | | | Amount [wt %] | Kind | Viscosity [mm²/s] |
| A-1 | A | 150 | 10 | Amino-modified silicone oil | 1,700 |
| A-2 | A | 150 | 5 | Amino-modified silicone oil | 1,700 |
| A-3 | A | 150 | 15 | Amino-modified silicone oil | 1,700 |
| A-4 | B | 120 | 10 | Carboxy-modified silicone oil | 2,000 |
| A-5 | C | 200 | 10 | Amino-modified silicone oil | 5,700 |
| A-6 | D | 160 | 10 (Total) | Unmodified silicone oil Phenol-modified silicone oil | 1,000 |

TABLE 1-continued

| Kind of treatment liquid | Kind of raw material emulsion | Average particle size of emulsified particles (nm) | Silicone oil | | |
|---|---|---|---|---|---|
| | | | Amount [wt %] | Kind | Viscosity [mm$^2$/s] |
| A-7 | E | 220 | 10 (Total) | Unmodified silicone oil<br>Silanol-modified silicone oil | 1,200 |
| B-1 | F | — | — | Unmodified silicone oil | 3,000 |

The meaning of each term in Table 1 above and Table 4 shown later is as follows. "Amount" indicates the percentage content of silicone oil in the treatment liquid. "wt %" indicates % by mass. "Viscosity" indicates the viscosity of silicone oil. In a case where the emulsified particles contain two or more kinds of silicone oils, "viscosity" indicates the viscosity of a mixture of the two or more kinds of silicone oils. "-" indicates that the raw material emulsion F could not be prepared and the preparation of treatment liquid (B-1) could not be performed.

As shown in Table 1 above, the treatment liquids (A-1) to (A-7) all contain emulsified particles containing a silicone oil and an aqueous medium. Furthermore, in all of the treatment liquids (A-1) to (A-7), the average particle size of the emulsified particles is in the range of 100 nm or more and 250 nm or less. On the other hand, the raw material emulsion F for the treatment liquid (B-1) could not be prepared.

[Method for Measuring Each Physical Property]

The average particle size of emulsified particles in raw material emulsions and the viscosity of silicone oil were measured by the methods described below.

<Measurement of Average Particle Size of Emulsified Particles>

The average particle size of emulsified particles was measured in conformity with the method described in ISO 13321:1996 (Particle size analysis-Photon correlation spectroscopy) using a laser diffraction particle size distribution analyzer ("Zetasizer Nano ZS" manufactured by Malvern Panalytical Ltd.). For the measurement of the average particle size of emulsified particles, a measurement sample obtained by diluting the treatment liquid or raw material emulsion (in case of mixing two different raw material emulsions) 1000-fold with water was used. The average particle size of emulsified particles contained in the raw material emulsion and the average particle size of emulsified particles contained in the treatment liquid are approximately the same as each other.

<Measurement of Viscosity of Silicone Oil>

The viscosity of silicone oil was measured in conformity with the method described in JIS Z8803:2011 (method for measuring viscosity of liquid) in an environment at a temperature of 25° C. The Ubbelohde viscometer described in "6.2.3 Ubbelohde viscometer" of JIS Z8803:2011 was used to measure the viscosity of silicone oil.

[Evaluation Method]

Using each of the prepared treatment liquids, the color fastness to rubbing and suppression of deterioration in texture of various textile printing articles were evaluated. Specifically, ink for evaluation was prepared, textile printing articles using the ink for evaluation and the respective treatment liquids were fabricated, and the color fastness to rubbing and suppression of deterioration in texture thereof were evaluated. Hereinafter, the method for preparing the ink for evaluation, the method for fabricating the textile printing articles for evaluation, and various evaluation methods will be described in detail.

<Method for Preparing Ink for Evaluation>

Inks a and b to be used in the evaluation of treatment liquid were prepared by the method shown below.

(Method for Preparing Ink a)

Into a 1 L three-necked flask equipped with a stirring blade, 125 g of ion exchanged water and 2 g of nonionic surfactant ("SURFYNOL (registered trademark) 440" manufactured by Nissin Chemical Industry Co., Ltd., content: acetylene glycol ethylene oxide adduct) were put. While the contents in the flask were stirred, 165 g of propylene glycol, 100 g of black pigment dispersion ("AE2078F" manufactured by SANYO COLOR WORKS, LTD., content: C.I. Pigment Black 7, solid concentration: 20% by mass), and 108 g of binder resin particle dispersion ("SUPERFLEX 470" DKS Co., Ltd., content: polyurethane dispersion, solid concentration: 38% by mass) were sequentially added into the flask. The contents in the flask were stirred for 10 minutes to obtain ink a.

(Method for Preparing Ink b)

Into a 1 L three-necked flask equipped with a stirring blade, 140 g of ion exchanged water and 2 g of nonionic surfactant ("SURFYNOL (registered trademark) 440" manufactured by Nissin Chemical Industry Co., Ltd., content: acetylene glycol ethylene oxide adduct) were put. While the contents in the flask were stirred, 225 g of propylene glycol, 83 g of black pigment dispersion ("ACAK1" manufactured by Dainichiseika Color & Chemicals Mfg. Co., Ltd., content: C.I. Pigment Black 7, solid concentration: 15% by mass), and 50 g of binder resin particle dispersion ("Eternacoll (registered trademark) UW-1527F" manufactured by UBE Corporation, content: polyurethane dispersion, solid concentration: 40% by mass) were sequentially added into the flask. The contents in the flask were stirred for 10 minutes to obtain ink b.

<Method for Fabricating Textile Printing Article for Evaluation>

Textile printing articles for evaluation were fabricated using the inks and treatment liquids shown in Table 2 below. For example, for the evaluation of Example 1-1 in Table 2, the treatment liquid (A-1) and ink a were used.

A cotton broadcloth (manufactured by SHIKISENSHA CO., LTD., size: A4 size, warp and weft cotton yarn number: 40/1, warp density: 130 threads/inch, weft density: 75 threads/inch, basis weight: 122 g/m$^2$) was used as a textile printing target. An inkjet printer ("Colorio (registered trademark) PX-045A" manufactured by Seiko Epson Corporation) was used to fabricate textile printing articles for evaluation. The ink was filled in the first ink chamber of the first cartridge. The treatment liquid was filled in the second ink chamber of the second cartridge. The first cartridge and the second cartridge were loaded into the inkjet printer. The ink filled in the first ink chamber is ejected from the recording head of the inkjet printer. The treatment liquid filled in the second ink chamber is ejected from the processing head of the inkjet printer.

Using an inkjet printer, the ink was ejected from the recording head onto the textile printing target in an amount of ink ejected of 20 g/m² to form a solid image of ink. Next, using the inkjet printer, the treatment liquid was ejected from the processing head onto the textile printing target so that the amount of treatment liquid ejected was 20 g/m² as described above. In this way, a processing film having the same size as that of the solid image was formed on the solid image of ink with the treatment liquid. Next, the textile printing target was heated at 160° C. for 3 minutes to dry the ink and treatment liquid, thereby obtaining a textile printing article for evaluation.

<Evaluation of Color Fastness to Rubbing>

According to the dry test and wet test by the rubbing tester type II (Gakushin type) method described in JIS L-0849: 2013 (test method for color fastness to rubbing), the solid image formed on the textile printing article for evaluation was rubbed with a white cotton cloth for rubbing. In conformity with the "criteria for discoloration and fading" described in Clause 10 (determination of color fastness to rubbing) of JIS L-0801: 2011 (general rules for test method for color fastness to rubbing), the degree of coloration of the white cotton cloth for rubbing after rubbing was evaluated. The degree of coloration of the white cotton cloth for rubbing was determined on a nine grade scale (grade 1, grade 1 to 2, grade 2, grade 2 to 3, grade 3, grade 3 to 4, grade 4, grade 4 to 5, and grade 5 in descending order of degree of contamination). The color fastness to rubbing is more favorable as the degree of coloration of the white cotton cloth for rubbing is smaller (closer to grade 5). From the degree of coloration of the white cotton cloth for rubbing after the rubbing test, the color fastness to dry rubbing and the color fastness to wet rubbing were evaluated according to the following criteria. The determination result of the dry test was taken as the color fastness to dry rubbing, and the determination result of the wet test was taken as the color fastness to wet rubbing. The case where the evaluation was A or B was determined as pass, and the case where the evaluation was C was determined as failure. The determined color fastness to rubbing and the evaluation results thereof are summarized in Table 2 below.

(Evaluation Criteria for Color Fastness to Dry Rubbing)

Evaluation A: color fastness to dry rubbing is grade 4 or more.

Evaluation B: color fastness to dry rubbing is grade 3 to 4.

Evaluation C: color fastness to dry rubbing is grade 3 or less.

(Evaluation Criteria for Color Fastness to Wet Rubbing)

Evaluation A: color fastness to wet rubbing is grade 3 or more.

Evaluation B: color fastness to wet rubbing is grade 2 to 3.

Evaluation C: color fastness to wet rubbing is grade 2 or less.

<Evaluation on Suppression of Deterioration in Texture>

The unused textile printing target was folded in two along the warp (the longitudinal direction) and the distance (loop height) between the lower and upper cloth at the crease was measured. The measured loop height of the unused textile printing target was taken as the loop height before textile printing. Next, the region on which the solid image was formed of the textile printing article for evaluation was folded in two along the warp (the longitudinal direction), and the loop height was measured. The measured loop height of the textile printing article for evaluation was taken as the loop height after textile printing. The rate of change in loop height (unit: %) after textile printing was calculated according to the formula "change rate of loop height=100× loop height after textile printing/loop height before textile printing". It indicates that the deterioration in the texture of textile printing article is further suppressed as the rate of change in loop height is lower since the textile printing target is not stiffened and does not swell even after textile printing. It was evaluated whether the deterioration in the texture of textile printing article was suppressed from the rate of change in loop height according to the following criteria. The case where the evaluation was A or B was determined as pass, and the case where the evaluation was C was determined as failure. The measured rate of change in loop height and the evaluation results regarding suppression of deterioration in texture are summarized in Table 2 below.

(Evaluation Criteria for Suppression of Deterioration in Texture)

Evaluation A: Rate of change in loop height is 125% or less.

Evaluation B: Rate of change in loop height is more than 125% and 130% or less.

Evaluation C: Rate of change in loop height is more than 130%.

TABLE 2

| | | | Color fastness to rubbing | | | | |
| | Kind of | | Dry | | Wet | | Texture | |
| | treatment liquid | Ink | Grade | Evaluation | Grade | Evaluation | Height [%] | Evaluation |
|---|---|---|---|---|---|---|---|---|
| Example 1-1 | A-1 | a | 4 | A | 3 | A | 110 | A |
| Example 1-2 | A-2 | a | 4 | A | 3 | A | 125 | A |
| Example 1-3 | A-3 | a | 4-5 | A | 2-3 | B | 105 | A |
| Example 1-4 | A-4 | a | 4 | A | 3-4 | A | 115 | A |
| Example 1-5 | A-5 | a | 4-5 | A | 3 | A | 120 | A |
| Example 1-6 | A-6 | a | 4 | A | 2-3 | B | 115 | A |
| Example 1-7 | A-7 | a | 4 | A | 2-3 | B | 110 | A |
| Example 1-8 | A-1 | b | 4 | A | 3 | A | 110 | A |
| Comparative Example 1-1 | B-1 | a | — | — | — | — | — | — |

The meaning of each term in Table 2 above and Table 3 shown below is as follows. "Texture" indicates the evaluation regarding suppression of deterioration in the texture of textile printing article. "Height" indicates the rate of change in loop height after textile printing. "1 to 2", "2 to 3", "3 to 4" and "4 to 5" in the column of color fastness to rubbing indicate grades 1 to 2, 2 to 3, 3 to 4 and 4 to 5 of the degree of coloration of the white cotton cloth for rubbing, respectively. "-" indicates that the raw material emulsion F could not be prepared, the preparation of treatment liquid (B-1) was not performed, and the evaluation of treatment liquid (B-1) could not be performed as described above.

Discussion

As shown in Table 2 above, the color fastness to dry rubbing, color fastness to wet rubbing, and suppression of deterioration in the texture of textile printing articles fabricated using the treatment liquids (A-1) to (A-7) were all evaluated as A or B regardless of the kind of ink. Hence, according to the inkjet treatment liquid of the present embodiment, including the treatment liquids (A-1) to (A-7), it is determined that a textile printing article excellent in the color fastness to rubbing can be fabricated and deterioration in the texture of textile printing article can be suppressed.

2. Evaluation Test of Color Fastness to Rubbing and Suppression of Deterioration in Texture of Textile Printing Article when Amount of Treatment Liquid Ejected is Varied In this test, the above-described treatment liquid (A-1) was used as the inkjet treatment liquid, various textile printing articles for evaluation were fabricated while varying the amount of treatment liquid ejected, and the color fastness to rubbing and suppression of deterioration in the texture of textile printing articles for evaluation were evaluated.

<Method for Fabricating Textile Printing Articles for Evaluation of Examples 1-1, 1-9 to 1-11, and 1-8>

Regarding the fabrication of textile printing articles for evaluation of Examples 1-1, 1-9 to 1-11, and 1-8, textile printing articles for evaluation were fabricated by the same method as the method for fabricating a textile printing article for evaluation described in 1. above, except that the following points were changed. Specifically, the ink shown in Table 3 later was filled in the first ink chamber of the first cartridge, and the treatment liquid (A-1) was filled in the second ink chamber of the second cartridge. In each Example, the amount of treatment liquid ejected was set to the ejected amount shown in Table 3 later. The amount of ink ejected was not changed from 20 g/m².

<Method for Fabricating Textile Printing Article for Evaluation of Example 1-12>

Regarding the fabrication of textile printing article of Example 1-12, a textile printing target on which a solid image of ink was formed was fabricated by the same method as the method for fabricating a textile printing article for evaluation described in 1. above, except that the following points were changed. Specifically, the ink shown in Table 3 later was filled in the first ink chamber of the first cartridge, and the treatment liquid was not filled in the second ink chamber of the second cartridge. In other words, the amount of treatment liquid ejected was set to 0 g/m² and the treatment liquid was not ejected from the processing head. The amount of ink ejected was not changed from 20 g/m².

Next, the textile printing target on which a solid image of ink was formed was impregnated with the treatment liquid (A-1), then taken out from the treatment liquid (A-1), and lightly squeezed. For detail, the textile printing target was squeezed so that the pickup rate was 100% and the amount of treatment liquid (A-1) applied was 120 g/m². The squeezed textile printing target was heated at 160° ° C. for 3 minutes to dry the ink and treatment liquid, thereby obtaining a textile printing article for evaluation.

<Evaluation of Color Fastness to Rubbing and Suppression of Deterioration in Texture>

The textile printing articles for evaluation fabricated using the treatment liquid (A-1) of Examples 1-1, 1-9 to 1-12, and 1-8 were evaluated in the same manner as the evaluation of color fastness to rubbing described in 1. above and in the same manner as the evaluation of suppression of deterioration in texture described in 1. above. The evaluation results are shown in Table 3 below. The evaluation results for the textile printing articles for evaluation fabricated using the treatment liquid (A-1) used in Examples 1-1 and 1-8 have already been shown in Table 2 above, but are shown again in Table 3 below to aid understanding.

TABLE 3

| | Treatment liquid | | | Color fastness to rubbing | | | | Texture | |
| --- | --- | --- | --- | --- | --- | --- | --- | --- | --- |
| | Kind of treatment liquid | Ejected amount (total amount) [g/m²] | Ink | Dry | | Wet | | Height | |
| | | | | Grade | Evaluation | Grade | Evaluation | [%] | Evaluation |
| Example 1-1 | A-1 | 20 | a | 4 | A | 3 | A | 110 | A |
| Example 1-9 | A-1 | 15 | a | 4 | A | 2-3 | B | 115 | A |
| Example 1-10 | A-1 | 30 | a | 4-5 | A | 2-3 | B | 105 | A |
| Example 1-11 | A-1 | 10 | a | 3-4 | B | 2-3 | B | 120 | A |
| Example 1-12 | A-1 | 120 (Applied amount) | a | 3-4 | B | 2-3 | B | 130 | B |
| Example 1-8 | A-1 | 20 | b | 4 | A | 3 | A | 110 | A |

Discussion

As shown in Table 3 above, the color fastness to dry rubbing, color fastness to wet rubbing, and suppression of deterioration in the texture of textile printing articles fabricated in an ejected amount (including applied amount) of 10 g/m² or more and 120 g/m² or less were all evaluated as A or B. Hence, it is determined that a textile printing article excellent in the color fastness to rubbing can be fabricated and deterioration in the texture of textile printing article can be suppressed by ejecting or applying the inkjet treatment liquid of the present embodiment in a wide range of ejected amount (including applied amount) of 10 g/m² or more and 120 g/m² or less.

As shown in Table 3 above, the color fastness to dry rubbing of a textile printing article formed using the treatment liquid (A-1) in an ejected amount of 15 g/m² or more and 30 g/m² or less was evaluated as A. Hence, it is determined that a textile printing article particularly excellent in the color fastness to dry rubbing can be fabricated by ejecting the inkjet treatment liquid of the present embodiment in an ejected amount of 15 g/m$^2$ or more and 30 g/m$^2$ or less.

3. Evaluation Test of Color Fastness to Rubbing and Ejectability when Average Particle Size of Emulsified Particles is Varied In this test, various textile printing articles were fabricated while changing the average particle size of emulsified particles. Thereafter, the color fastness to rubbing of various textile printing articles fabricated was evaluated. At the same time, the ejectability of the treatment liquid from the nozzle according to the average particle size of emulsified particles in each treatment liquid was also evaluated.

[Method for Preparing Treatment Liquid]

In this test, treatment liquids were used in which the average particle size of the emulsified particles containing a carboxy-modified silicone oil or the average particle sizes of both the emulsified particles containing a carboxy-modified silicone oil and the emulsified particles containing an unmodified silicone oil were varied to various values. Hereinafter, the methods for preparing treatment liquids (C-1) to (C-6) and treatment liquids (D-1) to (D-4) used in this test will be described in detail.

<Preparation of Treatment Liquid (C-1)>

A treatment liquid (C-1) was obtained by the same method as the method for preparing the treatment liquid (A-4) described in 1. above, except that 50 g of a sodium hydroxide aqueous solution, 570 g of ion exchanged water, and 80 g of a surfactant (polyoxyethylene alkyl ether) were added and stirring and mixing was performed during the preparation of raw material emulsion B. The average particle size of emulsified particles containing a carboxy-modified silicone oil in the treatment liquid (C-1) was 102 nm.

<Preparation of Treatment Liquid (C-2)>

A treatment liquid (C-2) was obtained by the same method as the method for preparing the treatment liquid (A-4) described in 1. above, except that 50 g of a sodium hydroxide aqueous solution, 590 g of ion exchanged water, and 60 g of a surfactant (polyoxyethylene alkyl ether) were added and stirring and mixing was performed during the preparation of raw material emulsion B. The average particle size of emulsified particles containing a carboxy-modified silicone oil in the treatment liquid (C-2) was 137 nm.

<Preparation of Treatment Liquid (C-3)>

A treatment liquid (C-3) was obtained by the same method as the method for preparing the treatment liquid (A-4) described in 1. above, except that 50 g of a sodium hydroxide aqueous solution, 610 g of ion exchanged water, and 40 g of a surfactant (polyoxyethylene alkyl ether) were added and stirring and mixing was performed during the preparation of raw material emulsion B. The average particle size of emulsified particles containing a carboxy-modified silicone oil in the treatment liquid (C-3) was 189 nm.

<Preparation of Treatment Liquid (C-4)>

A treatment liquid (C-4) was obtained by the same method as the method for preparing the treatment liquid (A-4) described in 1. above, except that 50 g of a sodium hydroxide aqueous solution, 630 g of ion exchanged water, and 20 g of a surfactant (polyoxyethylene alkyl ether) were added and stirring and mixing was performed during the preparation of raw material emulsion B. The average particle size of emulsified particles of carboxy-modified silicone oil in the treatment liquid (C-4) was 247 nm.

<Preparation of Treatment Liquid (C-5)>

The raw material emulsion used in the preparation of treatment liquid (C-1) was used as the first raw material emulsion. The average particle size of emulsified particles of carboxy-modified silicone oil contained in this first raw material emulsion was 102 nm.

A second raw material emulsion containing an unmodified silicone oil was then prepared. Specifically, 300 g of unmodified silicone oil (specifically, dimethylpolysiloxane) ("KF96-3000cs" manufactured by Shin-Etsu Chemical Co., Ltd., viscosity: 3,000 mm$^2$/s, specific gravity: 0.97), 610 g of ion exchanged water, and 90 g of surfactant (polyoxyethylene alkyl ether) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a second raw material emulsion containing an unmodified silicone oil. The average particle size of emulsified particles of unmodified silicone oil contained in this second raw material emulsion was 115 nm.

To 16.67 g of first raw material emulsion and 16.67 g of second raw material emulsion, 33.31 g of ion exchanged water and 33.35 g of propylene glycol were added and mixed to obtain a treatment liquid (C-5). The average particle size of emulsified particles in the treatment liquid (C-5) (average particle size of emulsified particles during mixing) was 106 nm.

<Preparation of Treatment Liquid (C-6)>

The raw material emulsion used in the preparation of treatment liquid (C-4) was used as the first raw material emulsion. The average particle size of emulsified particles of carboxy-modified silicone oil contained in this first raw material emulsion was 247 nm.

A second raw material emulsion containing an unmodified silicone oil was then prepared. Specifically, 300 g of unmodified silicone oil (specifically, dimethylpolysiloxane) ("KF96-3000cs" manufactured by Shin-Etsu Chemical Co., Ltd., viscosity: 3,000 mm$^2$/s, specific gravity: 0.97), 655 g of ion exchanged water, and 45 g of surfactant (polyoxyethylene alkyl ether) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a second raw material emulsion containing an unmodified silicone oil. The average particle size of emulsified particles of unmodified silicone oil contained in this second raw material emulsion was 240 nm.

To 16.67 g of first raw material emulsion and 16.67 g of second raw material emulsion, 33.31 g of ion exchanged water and 33.35 g of propylene glycol were added, and mixing was performed to obtain a treatment liquid (C-6). The average particle size of emulsified particles in the treatment liquid (C-6) (average particle size of emulsified particles during mixing) was 245 nm.

<Preparation of Treatment Liquid (D-1)>

A treatment liquid (D-1) was obtained by the same method as the method for preparing the treatment liquid (A-4) described in 1. above, except that 50 g of a sodium hydroxide aqueous solution, 560 g of ion exchanged water, and 90 g of a surfactant (polyoxyethylene alkyl ether) were added and stirring and mixing was performed during the preparation of raw material emulsion B. The average particle size of emulsified particles of carboxy-modified silicone oil in the treatment liquid (D-1) was 75 nm.

<Preparation of Treatment Liquid (D-2)>

A treatment liquid (D-2) was obtained by the same method as the method for preparing the treatment liquid (A-4) described in 1. above, except that 50 g of a sodium hydroxide aqueous solution and 650 g of ion exchanged water were added but a surfactant was not added and stirring and mixing was performed during the preparation of raw material emulsion B. The average particle size of emulsified particles of carboxy-modified silicone oil in the treatment liquid (D-2) was 323 nm.

<Preparation of Treatment Liquid (D-3)>

The raw material emulsion used in the preparation of treatment liquid (D-1) was used as the first raw material emulsion. The average particle size of emulsified particles of carboxy-modified silicone oil contained in this first raw material emulsion was 75 nm.

A second raw material emulsion containing an unmodified silicone oil was then prepared. Specifically, 300 g of unmodified silicone oil (specifically, dimethylpolysiloxane) ("KF96-3000cs" manufactured by Shin-Etsu Chemical Co., Ltd., viscosity: 3,000 mm$^2$/s, specific gravity: 0.97), 580 g of ion exchanged water, and 120 g of surfactant (polyoxyethylene alkyl ether) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a second raw material emulsion containing an unmodified silicone oil. The average particle size of emulsified particles of unmodified silicone oil contained in this second raw material emulsion was 86 nm.

To 16.67 g of first raw material emulsion and 16.67 g of second raw material emulsion, 33.31 g of ion exchanged water and 33.35 g of propylene glycol were added, and mixing was performed to obtain a treatment liquid (D-3). The average particle size of emulsified particles in the treatment liquid (D-3) (average particle size of emulsified particles during mixing) was 80 nm.

<Preparation of Treatment Liquid (D-4)>

The raw material emulsion used in the preparation of treatment liquid (D-2) was used as the first raw material emulsion. The average particle size of emulsified particles of carboxy-modified silicone oil contained in this first raw material emulsion was 323 nm.

A second raw material emulsion containing an unmodified silicone oil was then prepared. Specifically, 300 g of unmodified silicone oil (specifically, dimethylpolysiloxane) ("KF96-3000cs" manufactured by Shin-Etsu Chemical Co., Ltd., viscosity: 3,000 mm$^2$/s, specific gravity: 0.97), 680 g of ion exchanged water, and 20 g of surfactant (polyoxyethylene alkyl ether) were put into a beaker. Using a homogenizer ("Ultra Turrax T25" manufactured by IKA), the contents in the beaker were stirred at a rotation speed of 10000 rpm for 15 minutes and left to stand for 30 minutes. Next, the contents in the beaker were filtered through a 120 mesh stainless filter to obtain a second raw material emulsion containing an unmodified silicone oil. The average particle size of emulsified particles of unmodified silicone oil contained in this second raw material emulsion was 350 nm.

To 16.67 g of first raw material emulsion and 16.67 g of second raw material emulsion, 33.31 g of ion exchanged water and 33.35 g of propylene glycol were added, and mixing was performed to obtain a treatment liquid (D-4). The average particle size of emulsified particles in the treatment liquid (D-4) (average particle size of emulsified particles during mixing) was 340 nm.

Next, textile printing articles for evaluation were fabricated using the prepared treatment liquids (C-1) to (C-6) and treatment liquids (D-1) to (D-4), and the color fastness to rubbing thereof was evaluated.

<Method for Fabricating Textile Printing Articles for Evaluation of Examples 2-1 to 2-6 and Comparative Examples 2-1 to 2-4>

Regarding the fabrication of textile printing articles of Examples 2-1 to 2-6 and Comparative Examples 2-1 to 2-4, textile printing articles for evaluation were fabricated by the same method as the method for fabricating a textile printing article for evaluation described in 1. above, except that the following points were changed. Specifically, the ink a was filled in the first ink chamber of the first cartridge and any of the treatment liquids (C-1) to (C-6) and treatment liquids (D-1) to (D-4) shown in Table 4 later was filled in the second ink chamber of the second cartridge. The method for preparing the ink used is the same as the method described in 1. above. In Examples and Comparative Examples, the amount of treatment liquid ejected was set to 10 g/m$^2$. The amount of ink ejected was set to 20 g/m$^2$.

<Evaluation of Color Fastness to Rubbing>

The textile printing articles of Examples 2-1 to 2-6 and Comparative Examples 2-1 to 2-4 were evaluated in the same manner as the evaluation of color fastness to rubbing described in 1. above. The evaluation results of the textile printing articles of Examples and Comparative Examples are summarized in Table 4 below.

In this test, the ejectability of the treatment liquids (C-1) to (C-6) and treatment liquids (D-1) to (D-4) used in Examples and Comparative Examples from the processing head was also evaluated. Hereinafter, the method for evaluating ejectability will be described in detail.

<Evaluation of Ejectability>

The ejectability of treatment liquid was evaluated using an ejection evaluation machine ("KJ4B" manufactured by KYOCERA Corporation) capable of examining the ejection of one droplet of treatment liquid from the nozzle by the image of the camera. The conditions in the ejection evaluation machine were set as follows.

(Conditions of Ejection Evaluation Machine)

Head temperature: 32° ° C.

Amount of treatment liquid ejected from head: 10 g/m$^2$

Drive frequency: 30 kHz

A specific method for evaluating ejectability is as follows. First, using the ejection evaluation machine, the camera position was adjusted so that three nozzles could be seen in one field of vision. Next, the ejection of treatment liquid was started, and it was visually examined through the image of the camera whether the treatment liquid was normally ejected for one minute. After one minute had passed, the number of nozzles that were normally ejecting the treatment liquid was counted. Here, the nozzles that were normally ejecting the treatment liquid are nozzles other than the nozzles that were not normally ejecting the treatment liquid (nozzles that were not ejecting the treatment liquid straight, nozzles that were not ejecting the treatment liquid, nozzles from which the treatment liquid was overflowing, and the like). Furthermore, the camera position was moved, and examination of the ejectability of treatment liquid for one minute through the image of the camera was similarly repeated, targeting other nozzles. A total of 36 nozzles were examined at a total of 12 locations. Lastly, the nozzles that were normally ejecting the treatment liquid were totaled, and the ejectability of treatment liquid was evaluated according to the following criteria.

(Criteria)

A: 36

B: 34 to 35

C: 33 or less

The kinds of treatment liquids (average particle sizes of emulsified particles, kinds of silicone oils, and the like) used in Examples and Comparative Examples and the evaluation results of color fastness to rubbing and ejectability are summarized in Table 4 below.

liquid is high and the water resistance of textile printing article is thus poor. Regarding the textile printing article of Comparative Example 2-2 in which the treatment liquid (D-2) having an average particle size of emulsified particles of 323 nm was used and the textile printing article of

TABLE 4

| | | Treatment liquid | | | | | | | | | | |
|---|---|---|---|---|---|---|---|---|---|---|---|---|
| | | | | | Emulsified particles in treatment liquid | | | | Evaluation result | | | |
| | | | Amount of silicone oil in treatment liquid | | Average particle size of emulsified particles containing carboxy-modified silicone oil [nm] | Average particle size of emulsified particles containing unmodified silicone oil [nm] | Average particle size when two emulsified particles are mixed [nm] | | Color fastness to rubbing | | | |
| | | | | | | | | | Dry | | Wet | |
| | Kind of treatment liquid | Kind of silicone oil in treatment liquid | Amount [wt %] | Total amount [wt %] | | | | Eject-ability | Grade | Eval-uation | Grade | Eval-uation |
| Example 2-1 | C-1 | Carboxy-modified silicone oil | 10 | 10 | 102 | — | — | A | 4 | A | 3 | A |
| Example 2-2 | C-2 | Carboxy-modified silicone oil | 10 | 10 | 137 | — | — | A | 4 | A | 3 | A |
| Example 2-3 | C-3 | Carboxy-modified silicone oil | 10 | 10 | 189 | — | — | B | 4 | A | 3 | A |
| Example 2-4 | C-4 | Carboxy-modified silicone oil | 10 | 10 | 247 | — | — | B | 4 | A | 3 | A |
| Comparative Example 2-1 | D-1 | Carboxy-modified silicone oil | 10 | 10 | 75 | — | — | A | 3-4 | B | 2 | C |
| Comparative Example 2-2 | D-2 | Carboxy-modified silicone oil | 10 | 10 | 323 | — | — | C | 4 | A | 3 | A |
| Example 2-5 | C-5 | Carboxy-modified silicone oil | 5 | 10 | 102 | 115 | 106 | A | 4-5 | A | 3-4 | A |
| | | Unmodified silicone oil | 5 | | | | | | | | | |
| Example 2-6 | C-6 | Carboxy-modified silicone oil | 5 | 10 | 247 | 240 | 245 | B | 4-5 | A | 3 | A |
| | | Unmodified silicone oil | 5 | | | | | | | | | |
| Comparative Example 2-3 | D-3 | Carboxy-modified silicone oil | 5 | 10 | 75 | 86 | 80 | A | 3-4 | B | 2 | C |
| | | Unmodified silicone oil | 5 | | | | | | | | | |
| Comparative Example 2-4 | D-4 | Carboxy-modified silicone oil | 5 | 10 | 323 | 350 | 340 | C | 4 | A | 3 | A |
| | | Unmodified silicone oil | 5 | | | | | | | | | |

Discussion

As shown in Table 4 above, the color fastness to dry rubbing and the color fastness to wet rubbing were evaluated as A or B in all Examples 2-1 to 2-6 in which the treatment liquids (C-1) to (C-6) having an average particle size of emulsified particles of silicone oil (average particle size when the two kinds of emulsified particles are mixed in a case where two kinds of emulsified particles are contained) in the range of 100 nm or more and 250 nm or less were used. On the other hand, regarding the textile printing article of Comparative Example 2-1 in which the treatment liquid (D-1) having an average particle size of emulsified particles of 75 nm was used and the textile printing article of Comparative Example 2-3 in which the treatment liquid (D-4) having average particle sizes of emulsified particles of 75 nm and 86 nm was used, the color fastness to dry rubbing and the color fastness to wet rubbing, particularly the color fastness to wet rubbing were evaluated as being poor. It is assumed that this is because the hydrophilicity of treatment Comparative Example 2-4 in which the treatment liquid (D-4) having average particle sizes of emulsified particles of 323 nm and 350 nm was used, the ejectability was evaluated as being remarkably poor. It is assumed that this is because the meniscus becomes unstable in a case where the particle size is large.

In other words, when the average particle size of emulsified particles of silicone oil (average particle sizes of the two kinds of emulsified particles in a case where two kinds of emulsified particles are contained) in the treatment liquid was 100 nm or more and 250 nm or less, it was possible to fabricate a textile printing article that was excellent in ejectability of the treatment liquid and excellent in the color fastness to dry rubbing and the color fastness to wet rubbing.

It should be understood that the embodiments and Examples disclosed this time are illustrative in all points and not restrictive. The scope of the present disclosure is indicated by the claims rather than the above description, and is intended to include meanings equivalent to the claims and all modifications within the scope.

INDUSTRIAL APPLICABILITY

The treatment liquid, inkjet textile printing apparatus, and inkjet textile printing method according to the present disclosure can be used to form textile printing articles.

The invention claimed is:

1. An inkjet treatment liquid, comprising:
   emulsified particles containing a silicone oil; and
   an aqueous medium,
   wherein an average particle size of the emulsified particles is 100 nm or more and 250 nm or less,
   the percentage content of silicone oil in the treatment liquid is 5% by mass or more and 15% by mass or less, and
   the inkjet treatment liquid is a treatment liquid for post-processing.

2. The inkjet treatment liquid according to claim 1, wherein the average particle size of the emulsified particles is 100 nm or more and 160 nm or less.

3. The inkjet treatment liquid according to claim 1, wherein
   the emulsified particles include first emulsified particles and second emulsified particles having an average particle size different from an average particle size of the first emulsified particles,
   the average particle size of the first emulsified particles is 100 nm or more and 250 nm or less, and
   the average particle size of the second emulsified particles is 100 nm or more and 250 nm or less.

4. The inkjet treatment liquid according to claim 3, wherein
   the average particle size of the first emulsified particles is 100 nm or more and 160 nm or less, and
   the average particle size of the second emulsified particles is 100 nm or more and 160 nm or less.

5. The inkjet treatment liquid according to claim 3, wherein a difference between the average particle size of the first emulsified particles and the average particle size of the second emulsified particles is 0 nm or more and 30 nm or less.

6. The inkjet treatment liquid according to claim 1, wherein the silicone oil includes at least an ionic functional group-containing silicone oil.

7. The inkjet treatment liquid according to claim 6, wherein the ionic functional group-containing silicone oil is a carboxy-modified silicone oil.

8. The inkjet treatment liquid according to claim 1, wherein the silicone oil includes at least an unmodified silicone oil.

9. The inkjet treatment liquid according to claim 8, wherein the unmodified silicone oil is dimethylpolysiloxane.

10. The inkjet treatment liquid according to claim 1, wherein the silicone oil includes an ionic functional group-containing silicone oil and an unmodified silicone oil.

11. The inkjet treatment liquid according to claim 10, wherein the ionic functional group-containing silicone oil is a carboxy-modified silicone oil.

12. The inkjet treatment liquid according to claim 3, wherein the silicone oil includes an ionic functional group-containing silicone oil and an unmodified silicone oil, and
   the first emulsified particles contain the ionic functional group-containing silicone oil and the second emulsified particles contain the unmodified silicone oil.

13. The inkjet treatment liquid according to claim 1, wherein the silicone oil includes an ionic functional group-containing silicone oil and an unmodified silicone oil, and
   the ratio of the mass of the ionic functional group-containing silicone oil to the mass of the unmodified silicone oil is 0.5 or more and less than 1.0.

14. An inkjet textile printing apparatus, comprising:
   a recording head configured to eject ink onto an image forming region of a textile printing target;
   a processing head configured to eject a treatment liquid onto at least the image forming region of the textile printing target; and
   a cartridge filled with the treatment liquid,
   wherein the treatment liquid is the inkjet treatment liquid according to claim 1.

15. The inkjet textile printing apparatus according to claim 14, wherein the ink contains a pigment.

16. The inkjet textile printing apparatus according to claim 14, further comprising a heating unit configured to heat the textile printing target on which the ink and the treatment liquid are ejected.

17. An inkjet textile printing method, comprising:
   ejecting ink from a recording head onto an image forming region of a textile printing target; and
   ejecting a treatment liquid from a processing head onto at least the image forming region of the textile printing target,
   wherein the treatment liquid is the inkjet treatment liquid according to claim 1.

18. The inkjet textile printing method according to claim 17, wherein the ink contains a pigment.

19. The inkjet textile printing method according to claim 17, further comprising a heating at least the image forming region of the textile printing target on which the ink and the treatment liquid are ejected.

* * * * *